United States Patent Office 2,925,643
Patented Feb. 23, 1960

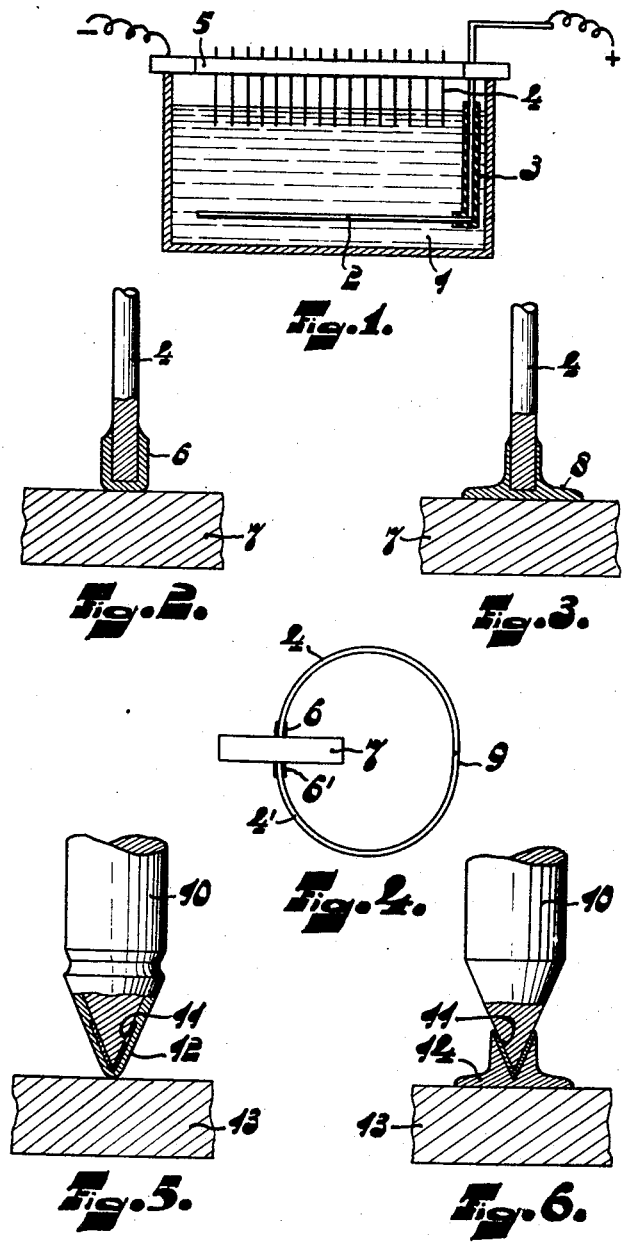

2,925,643
METHOD OF MANUFACTURING ELECTRODE SYSTEMS

Pieter Willem Haayman and Johannes Jacobus Asuerus Ploos Van Amstel, Eindhoven, Netherlands, assignors, by mesne assignments, to North American Philips Company, Inc., New York, N.Y., a corporation of Delaware Application December 7, 1954, Serial No. 473,603

Claims priority, application Netherlands December 31, 1953

2 Claims. (Cl. 29—25.3)

This invention relates to methods of manufacturing electrode systems by applying by fusion a small amount of material to a semi-conductive body and attaching a connecting wire in the resultant alloyed electrode. It is known to manufacture such electrode systems by placing on the semi-conductive body, for example a small block of germanium, an adjusted amount of another material, viz. a donor or an acceptor or an alloy containing a donor or an acceptor, in general referred to as impurities, and by heating the assembly so as to obtain a so-called alloyed electrode. Since the electrical properties are dependent upon the surface of the electrode, it is necessary for the said amount of material to be exactly adjusted or controlled. It is common practice to utilize this material in the form of small bodies of predetermined weight.

Subsequently, a connecting wire is soldered to the electrode.

As a result of the very small dimensions of such electrodes, the individual manipulations are complicated and time-consuming.

The object of the invention is inter alia to obviate the said disadvantages.

According to the invention, one end of a connecting wire is covered with an adjusted or predetermined amount of the electrode material, this end of the connecting wire subsequently being placed on the semi-conductive body and secured thereto by fusion.

The adjusted amount of material is preferably applied to the end of the connecting wire by galvanic means.

In order that the invention may be readily carried into effect, it will now be described with reference, by way of example, to the accompanying drawing.

Fig. 1 shows diagrammatically a device for covering wire extremities by galvanic means with electrode material.

Figs. 2 and 5 are cross-sectional views on a greatly enlarged scale of electrode systems before the application of electrode material and Figs. 3 and 6 show the said systems after the application of electrode material.

Fig. 4 shows diagrammatically an electrode system during the application of electrode material.

The electrode material which may consist of, for example, indium may be provided by galvanic means in a container 1 filled with a bath which is, for example, of the following composition:

| | | |
|---|---|---|
| Indium | gs | 20 |
| KCN | gs | 150 |
| KOH | gs | 35 |
| Dextrose | gs | 25 |
| Water | ccs | 1000 | and which contains an anode 2. The supply lead to the anode 2 is covered with an insulation 3. A plurality of connecting wires 4 are secured in a pinch 5 and connected in a cathode-like manner. The amount of current passed through the wires, which may be measured with an ampere-hour meter, is a measure of the amount of indium deposited.

After being provided with a certain amount of indium 6 (Fig. 2), the connecting wires 4 are placed on a germanium body 7, whereupon the assembly is heated, so that the indium fuses and a so-called alloyed electrode 8 is formed. The indium for the greater part flows off the wire 4 (Fig. 3).

If the electrode material consists of an alloy, the deposit by galvanic means may involve difficulty. In this case the components of the alloy may be caused to deposit separately. Thus, for example, for manufacturing a lead-antimony alloy, the two components may be caused to deposit on the end of a nickel wire. The alloy may subsequently be formed by heating and, if desired, it may at the same time be applied by fusion to the semi-conductive body.

As an alternative, it is possible for the electrode material to be applied to the connecting wires in a different manner, for example by evaporation, by atomisation or by the cataphoretic process.

The electrode material may be applied by placing the wires 4 and the semi-conductive body in a templet and subsequently heating the assembly, but a simpler method is to manufacture a resilient pinch having two limbs, at least one of which is constituted by a connecting wire, whereafter the semi-conductive body is provided between the pinch and the assembly is heated.

In the embodiment shown in Fig. 4, the pinch comprises two connecting wires 4 and 4', which are connected at their ends indicated by 9 and of which the free ends are covered with electrode material 6 and 6'. The body 7, together with the wires pinched on it, is introduced into an oven; after the thermal treatment the connecting wires 4 and 4' are separated. Despite the resilient pressure exerted by the wires upon the body, the resultant alloy is found to constitute a continuous layer under the wires. Advantageous factors active in this case are the superficial tension of the fused alloy and the weakening of the resilience at a high temperature.

It will be evident that the wires 4 and 4' need not be identical, it being possible for them to be matched individually to the requirements imposed upon the electrodes.

During the application of the electrode material, when the material of the connecting wire is moistened very well by the electrode material, it is possible that the latter may unduly adhere to the wire and even creep up along the wire.

In order to avoid the said disadvantage, it is possible to utilize a connecting wire consisting of a metal that is poorly moistened, such as tungsten, and to cover the extremity thereof with an intermediate layer which, on the contrary, is moistened very well, such as copper or gold. In this case the electrode material does not creep up beyond the said intermediate layer.

In Figs. 5 and 6 such a connecting wire, which may be, for example, of tungsten is indicated by 10. The point of the wire is covered through a short length with a thin layer of gold 11 and through a greater length with indium 12. After the indium has been applied by fusion to a semi-conductive body 13 and an alloyed electrode 14 has formed, it has withdrawn from the tungsten and adheres only to the gold layer 11.

What is claimed is:

1. A method of manufacturing a semi-conductor device, comprising depositing a predetermined quantity of an impurity material on selected portions of both ends of a wire-like member having a higher melting point than that of the impurity material, thereafter bending the wire-like member and placing both impurity-coated ends in contact with opposed surfaces of a wafer-shaped semi-conductive body, heating the body and member at a temperature at which only the impurity material fuses and alloys with the underlying portions of the semi-conductive body and also bonds the adjacent ends of the wire-like member to the semi-conductive body, and thereafter severing the wire-like member at a point intermediate its ends.

2. A method of manufacturing a semi-conductor device, comprising depositing a layer of a material selected from the group consisting of gold and copper on a selected portion of the end of a tungsten wire, thereafter depositing on the end of the tungsten wire including the layer a predetermined quantity of an impurity material, thereafter placing the impurity-coated wire in contact with a semi-conductive body, and heating the body and wire at a temperature at which most of the impurity melts and flows off the wire onto the body and only the impurity material fuses and alloys with a portion of the semi-conductive body and also bonds the wire to the semi-conductive body.

References Cited in the file of this patent

UNITED STATES PATENTS

| | | |
|---|---|---|
| 2,551,413 | Booe | May 1, 1951 |
| 2,665,399 | Lingel | Jan. 5, 1954 |
| 2,671,156 | Douglas et al. | Mar. 2, 1954 |
| 2,697,269 | Fuller | Dec. 21, 1954 |
| 2,733,390 | Scanlon | Jan. 31, 1956 |
| 2,750,542 | Armstrong et al. | June 12, 1956 |